United States Patent
Demirkaya et al.

(10) Patent No.: US 10,688,496 B2
(45) Date of Patent: Jun. 23, 2020

(54) SIMULATION CABINET

(71) Applicant: BINDER GmbH, Tuttlingen (DE)

(72) Inventors: Vedat Demirkaya, Obernburg (DE); Marco Mattes, Tuttlingen (DE); Martin Huepping, Hilzingen (DE); Ulf Christian Mueller, Kirchdorf AG (CH)

(73) Assignee: Binder GmbH, Tuttlingen (DE)

( * ) Notice: Subject to any disclaimer, the term of this patent is extended or adjusted under 35 U.S.C. 154(b) by 691 days.

(21) Appl. No.: 14/959,712

(22) Filed: Dec. 4, 2015

(65) Prior Publication Data

US 2016/0184828 A1 Jun. 30, 2016

(30) Foreign Application Priority Data

Dec. 16, 2014 (DE) .................. 10 2014 118 787

(51) Int. Cl.
*B01L 7/00* (2006.01)
*G01N 17/00* (2006.01)

(52) U.S. Cl.
CPC .............. *B01L 7/00* (2013.01); *G01N 17/002* (2013.01)

(58) Field of Classification Search
None
See application file for complete search history.

(56) References Cited

U.S. PATENT DOCUMENTS

| | | | |
|---|---|---|---|
| 3,009,582 A | | 11/1961 | Degener |
| 4,088,258 A | * | 5/1978 | Regalbuto ................. B22F 3/14 219/243 |
| 4,185,610 A | * | 1/1980 | Buckner ................ F24B 1/1885 126/502 |
| 4,338,996 A | * | 7/1982 | Frank ......................... E06B 7/02 160/127 |
| 4,430,558 A | * | 2/1984 | McWilliams ........ H05B 1/0216 219/448.19 |

(Continued)

FOREIGN PATENT DOCUMENTS

CN 203 123 982 U 8/2013
DE 439 918 A 1/1927

(Continued)

OTHER PUBLICATIONS

EPO search report for related application 15 194680.3 dated May 2, 2016.

(Continued)

*Primary Examiner* — Ibrahime A Abraham
*Assistant Examiner* — Gyounghyun Bae
(74) *Attorney, Agent, or Firm* — William Gary Mitchell

(57) ABSTRACT

The invention is a simulation cabinet with two side walls, a bottom wall, a top wall, an exterior wall, and an interior chamber, with a rear wall being arranged in the interior chamber at a distance from the exterior wall, and at least one ventilator arranged between the rear wall and the exterior wall, with the rear wall showing air openings for suctioning air from the interior chamber via the ventilator, with the rear wall showing at least one opening and at least a first flow restrictor each being arranged between the rear wall and the exterior wall such that the air suctioned by the ventilator through the air openings of the rear wall, after flowing through the flow restrictor, can be guided through the opening into the interior.

22 Claims, 6 Drawing Sheets

(56) References Cited

U.S. PATENT DOCUMENTS

| | | | | |
|---|---|---|---|---|
| 4,584,467 | A * | 4/1986 | Ruiz | B65G 1/07 211/59.3 |
| 4,708,252 | A | 11/1987 | Azzi | |
| 4,791,909 | A * | 12/1988 | Kalthoff | A23B 4/052 126/21 A |
| 4,829,158 | A * | 5/1989 | Burnham | F24C 15/325 126/21 A |
| 4,972,824 | A * | 11/1990 | Luebke | A21B 1/245 126/21 A |
| 5,000,085 | A * | 3/1991 | Archer | A47J 37/0623 126/21 A |
| 5,309,981 | A * | 5/1994 | Binder | F24C 15/025 126/21 A |
| 5,387,779 | A * | 2/1995 | Suzuki | F24C 7/00 219/394 |
| 5,432,674 | A * | 7/1995 | Hardt | G06F 1/20 361/688 |
| 5,545,841 | A * | 8/1996 | Wilfinger | B01L 1/02 174/17.08 |
| 5,590,583 | A * | 1/1997 | Harrison | A47J 37/0623 126/21 A |
| 5,751,549 | A * | 5/1998 | Eberhardt | G06F 1/20 361/679.33 |
| 6,444,955 | B1 | 9/2002 | Loveless | |
| 7,723,763 | B2 | 5/2010 | Chen et al. | |
| 7,784,457 | B2 | 8/2010 | Akdag et al. | |
| 8,297,270 | B2 * | 10/2012 | McFadden | A21B 1/245 126/21 A |
| 8,304,695 | B2 * | 11/2012 | Bonuso | F24C 15/325 126/21 A |
| 9,339,566 | B2 * | 5/2016 | Smith | A61L 2/06 |
| 9,629,499 | B2 * | 4/2017 | Kim | F24C 15/322 |
| 2001/0013420 | A1 * | 8/2001 | Formuso | H05K 5/0247 174/50 |
| 2004/0040950 | A1 * | 3/2004 | Carbone | F24C 15/325 219/400 |
| 2005/0019904 | A1 | 1/2005 | Zarur et al. | |
| 2006/0207280 | A1 * | 9/2006 | Avila | A47F 3/0408 62/255 |
| 2007/0081306 | A1 * | 4/2007 | Wong | G06F 1/20 361/695 |
| 2007/0095813 | A1 * | 5/2007 | Sung | F24C 15/325 219/400 |
| 2007/0206353 | A1 * | 9/2007 | Boone | H05K 7/20727 361/694 |
| 2009/0013988 | A1 * | 1/2009 | Kim | A47J 37/0623 126/21 A |
| 2009/0195129 | A1 | 8/2009 | Osawa et al. | |
| 2011/0056933 | A1 * | 3/2011 | Kanzaki | F24C 1/04 219/756 |
| 2011/0294412 | A1 * | 12/2011 | Vagedes | F24F 7/02 454/242 |
| 2012/0058670 | A1 * | 3/2012 | Regnier | H01R 13/65802 439/485 |
| 2012/0156019 | A1 * | 6/2012 | Gong | G06F 1/20 415/182.1 |
| 2014/0011391 | A1 | 4/2014 | Estrella et al. | |
| 2014/0110391 | A1 | 4/2014 | Estrella | |
| 2015/0260415 | A1 * | 9/2015 | Chadwick | F24C 15/006 126/21 R |

FOREIGN PATENT DOCUMENTS

| | | |
|---|---|---|
| DE | 26 18 998 A1 | 4/1976 |
| DE | 3329855 A1 | 9/1982 |
| DE | 41 16 500 A1 | 11/1992 |
| DE | 195 36 279 B4 | 9/1995 |
| DE | 198 25 226 A1 | 7/1999 |
| DE | 199 41 905 A1 | 4/2001 |
| DE | 20 2014 005 166 U1 | 6/2014 |
| DE | 20 2014 005 116 U1 | 8/2014 |
| EP | 1 209 421 A1 | 11/2001 |
| JP | 2003 047460 A | 2/2003 |
| WO | WO 2009/022847 A1 | 2/2009 |
| WO | WO 2012/02679 A1 | 5/2012 |

OTHER PUBLICATIONS

EPO search report for related application 15 195742.0 dated Apr. 21, 2016.

German office action for related application 10 2015 116 630.5 dated Jul. 29, 2016.

SIPO office action for related Chinese application 201510952296.1 dated Jun. 7, 2017.

SIPO office action for related Chinese application 201510952296.1 dated Jan. 29, 2018.

Textbook Detachable Coupling Design and Application: pp. 208-210, 349-354, published Mar. 2006.

RPO office action for related Russian application 2015 153 587 dated Jan. 29, 2018.

German office action for related application 10 2014 118 787.3 dated Sep. 7, 2015.

SIPO office action for related Chinese application 20150937860.2 dated Jun. 7, 2017.

\* cited by examiner

SIMULATION CABINET

CROSS REFERENCE TO RELATED APPLICATIONS

This patent application claims priority to German Patent Application 10 2014 118 787.3, filed on Dec. 16, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a simulation cabinet.

Background of the Invention

Simulation cabinets are used in scientific and industrial laboratories for the simulation of biological, chemical, and/or physical influences of the environment. During the simulation of influences from the environment the air flow used in the simulation cabinet is of decisive importance in order to allow generating in the cabinet a homogenous air distribution and thus appropriate temperature distribution as well.

A simulation cabinet as a laboratory heating cabinet is known from DE 41 16 500 A1. In the simulation cabinets of prior art, a pre-heating chamber with an integrated, powerful heating/cooling system, comprising a heating/cooling device and a ventilator, is arranged around an interior vessel. Air-baffles ensure that the entire air flow is guided over the heating and/or cooling elements, and subsequently enters the interior chamber via air vents in the lateral walls over wide areas and in a controlled fashion. By introducing air over the entire ide walls it shall be prevented that disturbing eddies are generated, preventing optimal homogeneity of the temperature inside the interior vessel.

The simulation cabinets of prior art show a complicated design in order to generate homogeneity of the temperature inside the interior chamber.

The objective of the invention therefore comprises to provide a simulation chamber, which shows a simple design and allows improved air guidance and thus advantageously a homogenous distribution of temperature inside the inner chamber of the simulation cabinet.

The object of the invention is attained in a simulation cabinet showing the features as described herein.

BRIEF SUMMARY OF THE INVENTION

In a preferred embodiment, a simulation cabinet with two side walls, a bottom wall, a top wall, an exterior wall, and an interior chamber, with a rear wall arranged in the interior chamber at a distance from the exterior wall, and at least one ventilator arranged between the rear wall and the exterior wall, with the rear wall showing ventilator openings for suctioning air from the interior chamber via the ventilator, wherein the rear wall comprises at least one opening and that a first flow restrictor is arranged between the rear wall and the exterior wall abutting it, such that the air suctioned by the ventilator through the ventilator openings of the rear wall, after flowing through the flow restrictor, can be guided through the opening into the interior chamber.

In another preferred embodiment, the simulation cabinet as described herein, wherein two flow restrictors are arranged between the rear wall and the exterior wall.

In another preferred embodiment, the simulation cabinet as described herein, wherein the rear wall and at least one flow restrictor are connected to each other as one piece.

The simulation cabinet according to claim 1, wherein at least one flow restrictor having a length equivalent to a distance from the bottom wall to the top wall of the simulation cabinet.

In another preferred embodiment, the simulation cabinet as described herein, wherein at least one flow restrictor has an angle (a) of essentially 90° with reference to the rear wall and the exterior wall.

In another preferred embodiment, the simulation cabinet as described herein, wherein at least one flow restrictor is embodied as a pinhole.

In another preferred embodiment, the simulation cabinet as described herein, wherein the rear wall has several openings, arranged in the proximity of interfaces of lateral edges of the rear wall, with a longitudinal extension of the proximities essentially being smaller than ⅓ of the length of a lateral edge of the rear wall.

In another preferred embodiment, the simulation cabinet as described herein, wherein at least one opening in a bottom-top direction respectively shows a greater extension than in a side wall-side wall direction.

In another preferred embodiment, the simulation cabinet as described herein, wherein the rear wall comprises, in the proximity to each intersection of the lateral edges of the rear wall, a pair of openings, with one pair comprising at least two openings, distanced in the side wall-side wall direction, aligned parallel.

In another preferred embodiment, the simulation cabinet as described herein, wherein, within a proximity of a first, second, and third interface of lateral edges of the rear wall, precisely one pair each of openings and three pairs of openings in a proximity of a fourth intersection of lateral edges of the rear wall being arranged, with the pairs in the proximity of the fourth intersection being arranged in the bottom-top direction.

In another preferred embodiment, the simulation cabinet as described herein, wherein each of the pairs in the proximity of the fourth intersection lateral edges of the rear wall extends parallel to the bottom-top direction, essentially with a respectively identical distance.

In another preferred embodiment, the simulation cabinet as described herein, wherein adjacent pairs of the pairs in the proximity of the fourth intersection in the bottom-top direction each have identical distances.

In another preferred embodiment, the simulation cabinet as described herein, wherein the openings have the same size of area content, respectively.

In another preferred embodiment, the simulation cabinet as described herein, further comprising wherein an air guidance element is arranged at the rear wall, with a first lateral edge at the rear wall and with a second side edge at a minimum of one flow restrictor.

In another preferred embodiment, the simulation cabinet as described herein, wherein, at an installation of the rear wall and at least one flow restrictor in the simulation cabinet, the first side edge of the air guidance element is arranged at a side wall of the simulation cabinet and the second lateral edge of the air guidance element abuts the exterior wall of the simulation cabinet.

In another preferred embodiment, the simulation cabinet as described herein, wherein the air guidance element, together with the rear wall and the abutting flow restrictor, respectively form an angle (β) showing essentially 45°.

In another preferred embodiment, the simulation cabinet as described herein, further comprising wherein at least one slot is arranged between the rear wall and the top.

In another preferred embodiment, the simulation cabinet as described herein, further comprising wherein at least one, preferably two slots are arranged between the rear wall and the bottom wall.

In another preferred embodiment, the simulation cabinet as described herein, further comprising wherein at least one heating device is arranged between the rear wall and the exterior wall, surrounding the ventilator, with the heating device surrounding the ventilator either helically or annularly.

In another preferred embodiment, the simulation cabinet as described herein, further comprising wherein the ventilator is surrounded by a first and a second heating device, with the second heating device surrounding the ventilator and the first heating device.

In another preferred embodiment, the simulation cabinet as described herein, wherein the first heating device is embodied helically and the second heating device annularly.

In another preferred embodiment, the simulation cabinet as described herein, wherein the two opposite side walls each comprise beads to support grids or sheet metals.

In another preferred embodiment, the simulation cabinet as described herein, further comprising wherein several ventilators are arranged between the rear wall and the exterior wall, with one separating wall arranged between the ventilators, respectively.

DETAILED DESCRIPTION OF THE INVENTION

Figure 1:
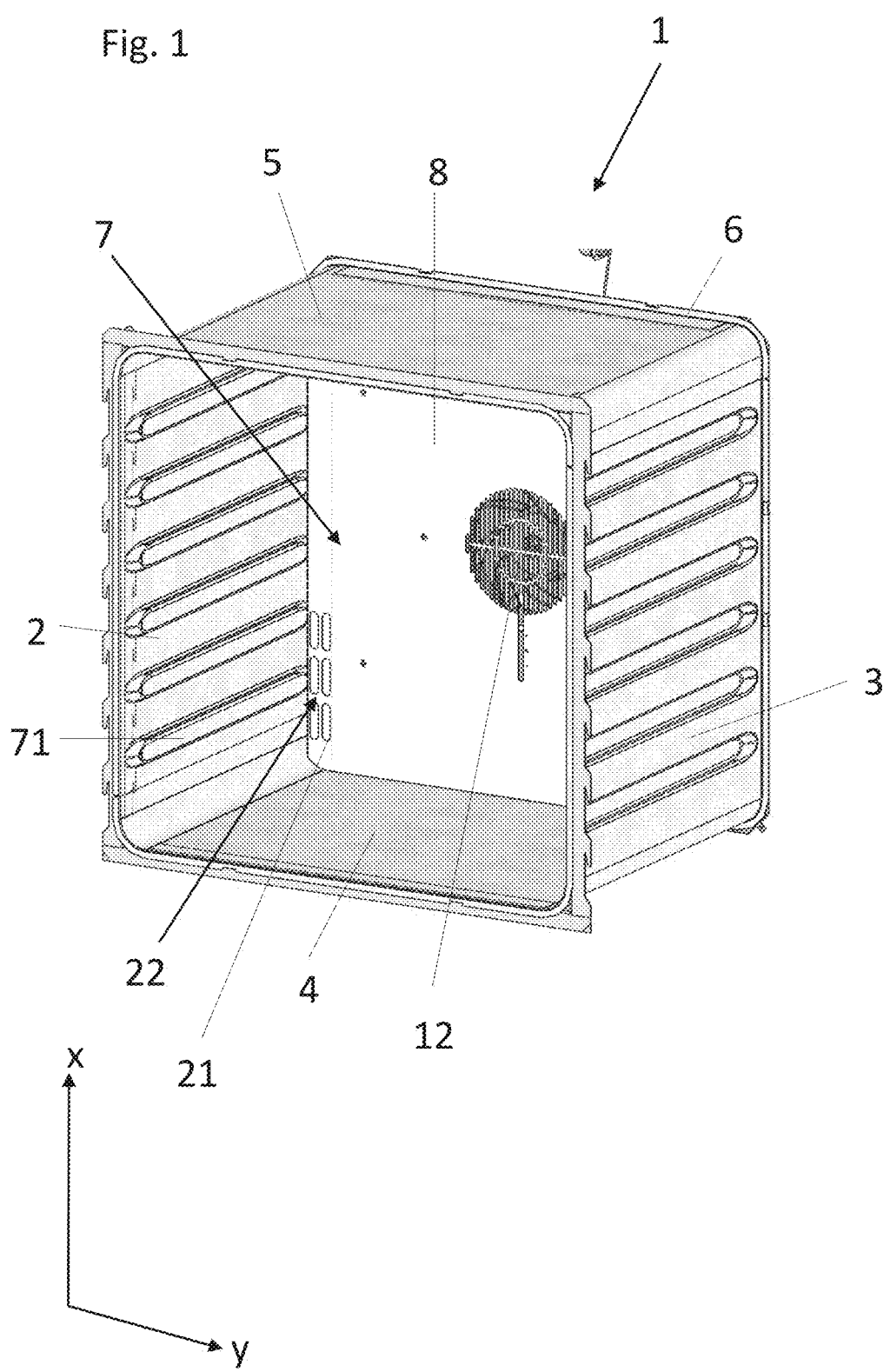
FIG. 1 is a line drawing evidencing a perspective view of an exemplary embodiment of a simulation cabinet.

The simulation cabinet according to the invention shows two side walls, a bottom wall, a top wall, an exterior wall, and an interior chamber, a rear wall arranged inside the interior chamber at a distance from the exterior wall, and at least one ventilator arranged between the rear wall and the exterior wall, with the rear wall comprising ventilation openings for suctioning in air from the interior chamber via the ventilator, is characterized in that the rear wall shows at least one opening and that at least a first flow restrictor is arranged between the rear wall and the exterior wall, abutting said exterior wall, that the air suctioned by the ventilator through the air openings in the rear wall, after passing through the flow restrictor, can be conducted through at least one opening into the interior chamber. The flow restrictor causes a throttling of the air flowing through the flow restrictor. After flowing through the flow restrictor, the air expands. Thus, after flowing through the flow restrictor, here a lower pressure results for the air in reference to said air upstream said flow restrictor. The mean particle distance of the air components increases by said expansion, which results in a change of the air temperature. Any inhomogeneous temperature distribution given upstream the flow restrictor is therefore rendered more homogenous upon passing the flow restrictor. This way, air with a more homogenous temperature distribution is conducted through the opening into the interior chamber, which leads to improved homogeneity of the temperature inside the interior chamber.

Advantageously, two flow restrictors are provided between the rear wall and the exterior wall, beneficially at both sides of the ventilator. With such an arrangement a symmetrical arrangement of the flow restrictors can be achieved in reference to the ventilator.

Preferably the rear wall and at least one flow restrictor are connected to each other in one piece. Such an arrangement facilitates the design of a simulation cabinet.

In another embodiment of the invention at least one flow restrictor shows essentially a length which is equivalent to a distance of the bottom wall from the top wall of the simulation cabinet. Such a flow restrictor extends along the entire extension of the rear wall and the exterior wall along the direction bottom-top. Accordingly, no section is given between the rear wall and the exterior wall in the direction bottom-top, through which air is conducted through the opening into the interior chamber without a prior flow reduction. This way, the effect of a homogenized distribution of air in the interior chamber is further promoted.

At least one of at least one flow restrictor can preferably be arranged at an angle of essentially 90°, respectively in reference to the rear wall and the exterior wall. Any air flow parallel in reference to the direction side wall-side wall therefor perpendicularly impinges a flow restrictor ar-ranged in this fashion. With a flow restrictor arranged at an angle of essentially 90° respectively in reference to the rear wall and the exterior wall, here the mixing of air after passing the flow restrictor can be minimized.

According to a preferred embodiment of the invention at least one flow restrictor is embodied as a pinhole. Pinholes are produced easily and cost-effectively.

According to a preferred further development of the invention the rear wall shows several openings, arranged in the proximity of intersections of the lateral edges of the rear wall, e.g., at the corners, with a longitudinal extension of the proximities essentially being smaller than one third of the length of the lateral edge of said rear wall. Openings in the corners of the rear wall promote the faster adjustment of a homogenous temperature distribution in the interior chamber.

Preferably at least one opening in the direction bottom-top shows respectively a greater size than one in a direction side lateral wall-side wall. Such slotted openings allow a better distribution of the air inside the used space.

According to a preferred embodiment of the invention the rear wall shows respectively at least one opening in the proximity of each intersection of the lateral edges of the rear wall, preferably at least one pair of openings, with one pair showing at least two openings distanced in the direction side wall-side wall, preferably aligned essentially parallel. Such an arrangement allows a more even distribution of air inside the interior chamber.

It is particularly preferred that in the proximity of a first, second, and third intersection of the lateral edges of the rear wall precisely one pair of openings and in the proximity of a fourth intersection of lateral edges of the rear wall several pairs of openings, preferably three ones, are arranged, with in the proximity of the fourth intersection the pairs are arranged distanced from each other in the direction bottom-top. Such an arrangement can compensate any asymmetrical distribution of air by the ventilator.

Preferably, every pair of the pairs in the proximity of the fourth intersection shows essentially the same even distance from the lateral edges of the rear wall extending parallel to the direction bottom-top. Such an arrangement can further improve the homogenized distribution of air in the interior chamber.

Advantageously the adjacent pairs of the pairs in the proximity of the fourth intersection in the direction bottom-top respectively show even distances. Such an arrangement can further improve the homogenized distribution of air in the interior chamber.

Advantageously the openings show essentially a respectively identically sized area. With such openings a homogenized distribution of the air inside the interior chamber can be improved.

In a further embodiment of the invention an air guidance element is arranged at the rear wall, which is arranged with a first lateral edge at a rear wall and with a second lateral edge at least at one flow restrictor. Such air guidance elements serve for the deflection of the air flowing through the flow restrictor in the direction towards the openings of the rear wall.

Preferably, upon installation of the rear wall and at least one flow restrictor in a simulation cabinet the first lateral edge of the air guidance element abuts a side wall of the simulation cabinet and the second lateral edge of the air guidance element abuts the exterior wall of the simulation cabinet. Such an arrangement of the air guidance element promotes the air guidance.

Preferably the air guidance element meets the rear wall and the abutting flow restrictor respectively at an angle of essentially 45°. Such an arrangement of the air guidance element allows a deflection of the air flowing parallel to the lateral edge of the rear wall to the air guidance element by 90°. The air deflected by the openings in the interior chamber can then flow parallel in reference to said lateral wall areas, which may benefit a homogenous temperature distribution in the interior chamber.

In another embodiment of the invention at least one slot is arranged between the rear wall and the top wall. Through such a slot, in addition to the openings in the rear wall, air can flow into the interior chamber.

Preferably, at least one, preferably two slots are arranged between the rear wall and the bottom wall. Through such a slot, in addition to the openings in the rear wall, air can flow into the interior chamber.

According to a preferred embodiment of the invention at least one heating device is arranged between the rear wall and the exterior wall, surrounding the ventilator, with the heating device surrounding the ventilator preferably in a helical or annular fashion. Such a heating device can evenly heat the air suctioned by the ventilator through the air openings at the rear wall.

Advantageously, the ventilator is surrounded by a first and a second heating device, with the second heating device sur-rounding the ventilator and the first heating device. Such heating devices can ensure improved performance of heating the air.

Preferably the first heating device is embodied helically and the second heating device annularly. Such an embodiment of the heating devices can further improve the above-mentioned heating of the air.

As an alternative to at least one heating device the invention may also show a cooling device, without it here being necessary to essentially change the principle design of the invention.

In a further development of the invention several ventilators are arranged between the rear wall and the exterior wall, with respectively a separating wall being arranged be-tween the ventilators. Several ventilators are particularly advantageous in case of large-scale simulation cabinets. The separating walls prevent any mutual influencing of the air flows of adjacent ventilators.

DETAILED DESCRIPTION OF THE FIGURES

FIG. 1 shows a perspective view of the interior chamber 7 of an exemplary embodiment of a simulation cabinet 1. The interior chamber 7 is limited by a top wall 5, a bottom wall 4 opposite said top wall 5, two opposite side walls 2, 3, a rear wall 8, and a door, not shown here, opposite the rear wall 8. The side walls 2, 3 may each show beads 71. Grids and/or sheet metals may be placed in or on these beads 71. The limiting walls 2, 3, 4, 5, 8 of the simulation cabinet 1 are essentially arranged respectively at a right angle in reference to each other, with the simulation cabinet 1 showing the form of a cuboid or a cube. The corners of the simulation cabinet 1 may be rounded.

Figure 2:
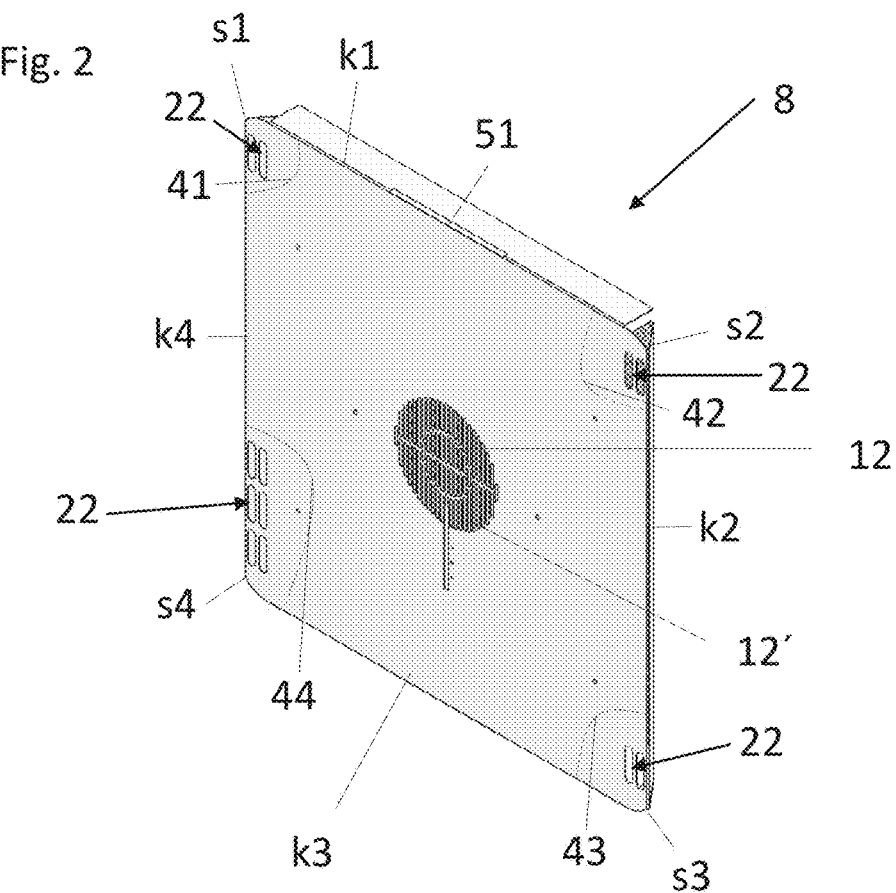
FIG. 2 is a line drawing evidencing a view from the front of an exemplary embodiment of a rear wall of a simulation cabinet according to FIG. 1.
Figure 3:
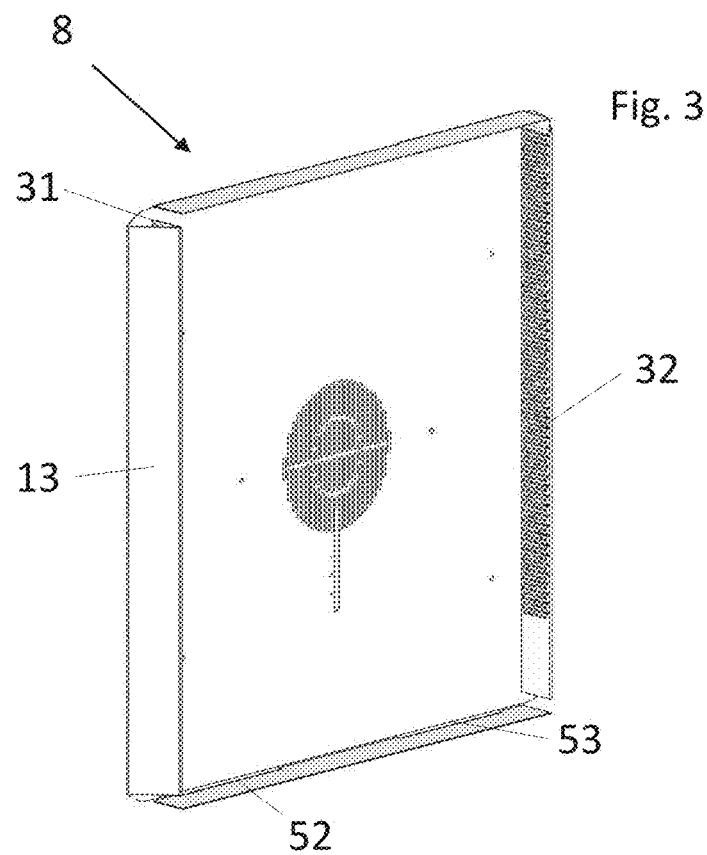
FIG. 3 is a line drawing evidencing a view from the rear of the rear wall according to FIG. 2.

The rear wall 8 is shown in FIGS. 2 and 3. FIG. 2 shows a rear view, FIG. 3 a front view of the rear wall 8. Ventilator openings 12 are arranged in the rear wall 8. The ventilator openings particularly form a grid structure. The ventilator openings 12 are embodied for example as slots 12' extending in the direction bottom-top x parallel in reference to each other, which may be arranged symmetrical about a point, for example a center point of the rear wall 8. The slots 12' may be arranged in a circular area.

Here and in the following, the direction bottom-top x marks a straight line, which respectively intersects perpendicularly the bottom wall 4 and the top wall 5. Here and in the following the direction side wall-side wall y marks a straight line, which respectively intersects perpendicularly the side walls 2,3.

Figure 4:
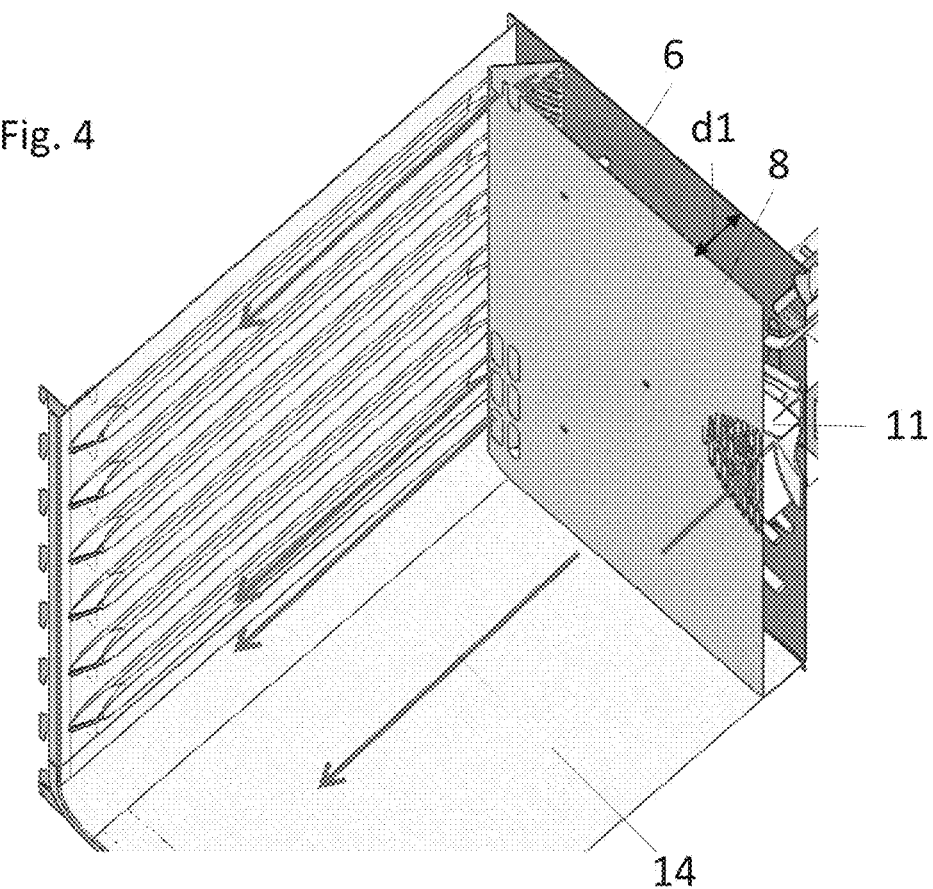
FIG. 4 is a line drawing evidencing a detail of the simulation cabinet according to FIG. 1 with a perspective view of the air flow in the simulation cabinet.
Figure 8:
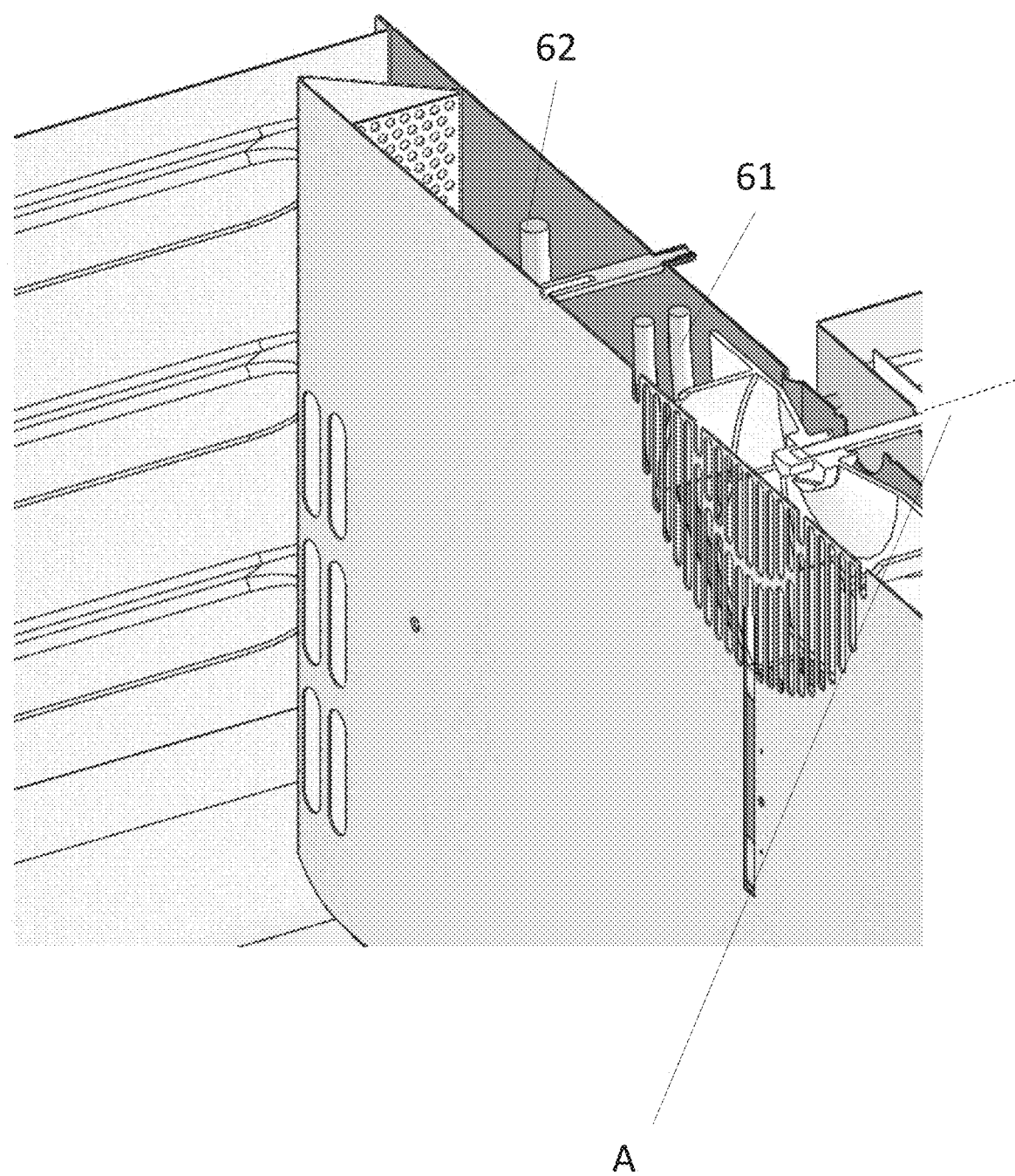
FIG. 8 is a line drawing evidencing a partially cross-sectioned perspective view of the simulation cabinet according to FIG. 1 with an exemplary embodiment of a ventilator and with an exemplary embodiment of a heating device.

Through the ventilation openings 12 in the rear wall 8 a ventilator 11, shown for example in FIGS. 4, 8, suctions air from the interior chamber 7. The ventilator 11 is located between the rear wall 8 and an exterior wall 6 arranged at a distance d1 from the rear wall 8 (cf. FIG. 4), directly behind the ventilator openings 12. The ventilator 11 may be a conventional ventilator, which generates a vacuum by way of rotations, allowing to suction air. An axis of rotation A of the ventilator 11 is particularly arranged perpendicular in reference to the rear wall 8. The suctioned air is discharged by the ventilator particularly in the radial direction and flow therefore subsequently essentially parallel to the rear wall 8.

The ventilator 11 may be surrounded by a first heating device 61 and/or a second heating device 62, as discernible particularly from FIG. 8. In the exemplary embodiment shown, both the first as well as the second heating device 61, 62 are provided. The first heating device 61 surrounds the ventilator 11 and is particularly embodied helically, for example showing two windings. The second heating device 62 surrounds the ventilator 11 and the first heating device 61, for example embodied as a ring, and shows therefore only one winding. The second heating device 62 is particularly arranged such that in the axial direction one winding of the second heating device 62 is arranged between the two windings of the first heating device 61. This way, a particularly homogenous heating of the air is achieved, by the air first being heated by the helical first heating device 61 and subsequently heated by the annular second heating device 62. Alternatively, the ventilator 11 may also be surrounded by only one heating device 61, 62. With the heating devices 61, 62 the air can be heated to a selected temperature. As an alternative to heating devices, depending on the simulation requirements, here cooling devices may also be provided in order to cool the air to a selectable temperature.

At least one flow restrictor 31 is arranged between the rear wall 8 and the exterior wall 6, with a width of the flow restrictor 31 being perhaps equivalent to the distance d1 between the rear wall 8 and the exterior wall 6. The flow restrictor 31 is arranged in reference to the exterior wall 6 at an angle α, which particularly represents a right angle. Advantageously two flow restrictors 31, 32 are arranged at both sides of the ventilator 11, particularly symmetrically in reference to said ventilator 11.

Figure 5:
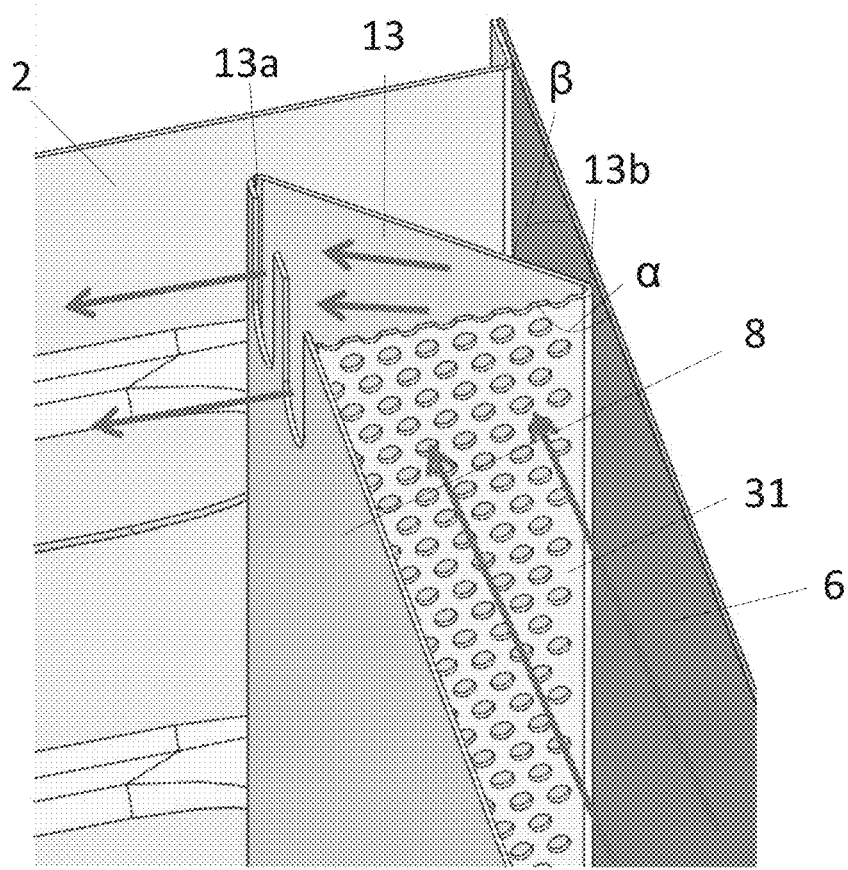
FIG. 5 is a line drawing evidencing a perspective detail of the air flow in the proximity of an exemplary embodiment of a flow restrictor of the simulation cabinet according to FIG. 1.

The air suctioned by the ventilator 11 from the interior chamber 7 into the enclosure between the rear wall 8 and the exterior wall 6 is guided through the ventilator 11 to the flow restrictor 31, 32, as shown for example in FIG. 3. FIG. 5 shows a detail of the flow restrictor 31. The arrows shown in FIG. 5 shall indicate the air flow 14. The following description applies similarly to the flow restrictor 32. The flow restrictor 31 may be made from sheet metal with a plurality of openings, which are punched out and/or circular, for example. In particular, the flow restrictor 31 may be embodied as a pinhole. Here, the flow restrictor 31 may show preferably a length which is equivalent to the distance between the bottom wall 4 and the top wall 5.

An air guidance element 13 is arranged between the flow restrictor 31 and the closest side wall 2. The air guidance element 13 may be embodied as a sheet metal. The air guidance element 13 is arranged such that in an installation of the rear wall 8 and the flow restrictor 31 in the simulation cabinet 1, here a first lateral edge 13a of the air guidance element 13 at the side wall 2 of the simulation cabinet 1 and a second lateral edge 13b of the air guidance element 13 are arranged abutting the exterior wall 6 of the simulation cabinet 1. For example, the air guidance element 13 forms with the exterior wall 6 and the side wall 2 an angle, for example respectively an angle β measuring for example 45°. The air flowing through the flow restrictor 31 in the direction side wall-side wall y can be deflected by the air guidance element 13, essentially deflected by 90°, cf. FIGS. 3 and 5. The air guidance element 13 deflects air flowing essentially perpendicularly through the flow restrictor 31 in a direction parallel to the side walls 2, 3, as illustrated by the arrows shown in FIG. 5.

The rear wall 8, the flow restrictors 31, 32, and the air guidance element 13 are advantageously connected fixed to each other and may be formed in one piece, for example. For example, the rear wall 8 is arranged in one piece at the first lateral edge 13a of the air guidance element 13, with the air guidance element 13 being bent at an angle of 45° in reference to the rear wall 8, for example, particularly towards the exterior wall 6. At the second lateral edge 13b of the air guidance element 13 the flow restrictor 31 is arranged in one piece, with the flow restrictor 31 being bent at an angle of 45°, for example, in reference to the air guidance element 12, particularly towards the rear wall 8, so that overall the flow restrictor 31 is aligned essentially at a right angle in reference to the rear wall 8.

In order to allow air from the enclosure between the rear wall 8 and the exterior wall 6 to reach the interior chamber 7, the rear wall 8 shows at least one opening 21, which is arranged such that the air suctioned by the ventilator 11 through the air openings 12 of the rear wall 8 can be guided, after flowing through the flow restrictor 31 and the opening 21, into the interior chamber 7. The flow restrictors 31, 32 are therefore arranged between the ventilator openings 12, on the one side, and the openings 21 at the rear wall 8, on the other side. The rear wall 8 particularly shows several openings 21, as discernible particularly from FIG. 2. The openings 21 are each embodied as slots, for example, which show a greater extension in the direction bottom-top x than in the direction side wall-side wall y. Two openings 21 each may form a pair 22 of openings, with the slots of each pair 22 extending parallel in reference to the direction bottom-top x. In a rear wall 8, showing in each corner at least one pair 22 of openings 21, two flow restrictors 31, 32 arranged at both sides of the ventilator 11 have proven particularly advantageous.

In one exemplary embodiment, the proximities 41, 42, 43 of a first intersection s1, second intersection s2, and third intersection s3 lateral edges k1, k2, k3, k4, of the rear wall i.e. from the edges of the rear wall 8, precisely one pair 22 of openings 21 are arranged each. In a proximity 44 of a fourth intersection s4 of the lateral edges k3, k4 of the rear wall three pairs 22 of openings 21 are arranged, with a distance between two adjacent pairs 22 in the bottom-top direction x potentially being identical. Using such an asymmetrical arrangement of pairs 22 of openings 21 in the rear wall 8 an asymmetrical air distribution of the ventilator 22 in the interior chamber 7 can be compensated. A longitudinal extension of the environments 41, 42, 43, 44 is preferably smaller than ⅓ of the length of the lateral edge k1, k2, k3, k4 of the rear wall. This longitudinal extension ensures that the openings are arranged in the edge sections of the rear wall 8.

Figure 6:
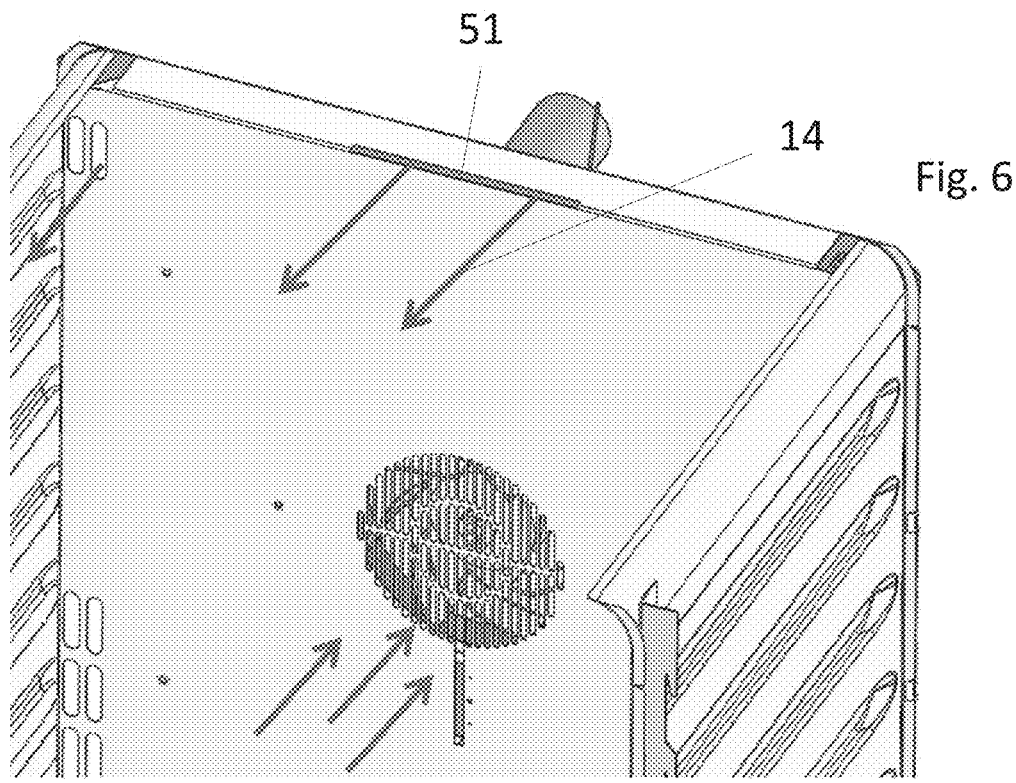
FIG. 6 is a line drawing evidencing a detail of a perspective view of the simulation cabinet according to FIG. 1.
Figure 7:
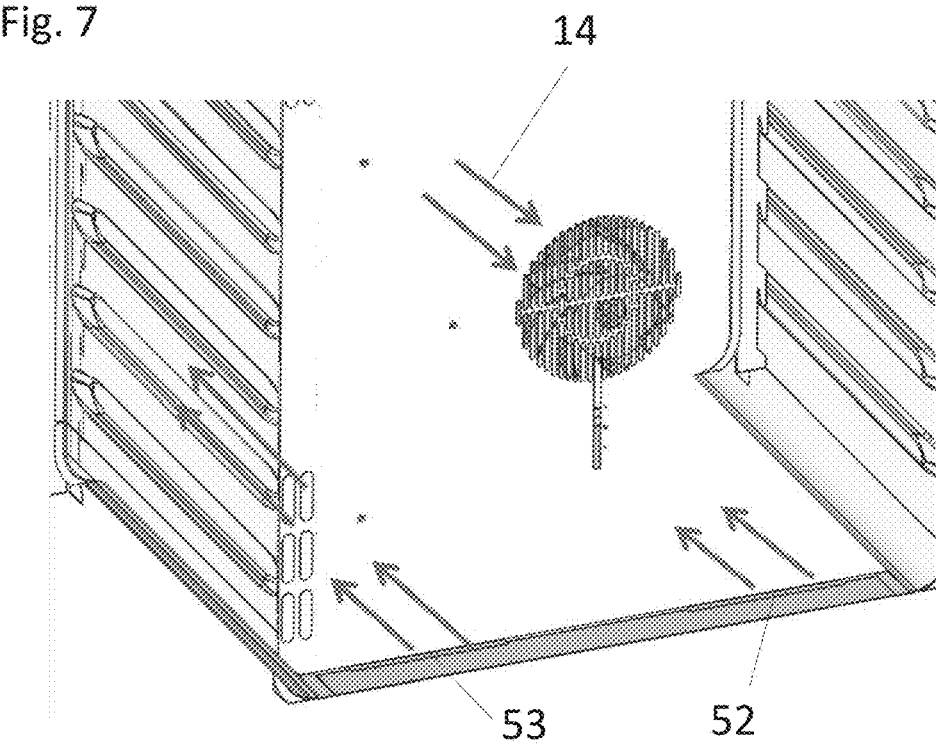
FIG. 7 is a line drawing evidencing another detail of a perspective view of the simulation cabinet according to FIG. 1.

Slots 51 and/or 52, 53 may be arranged between the rear wall 8 and the top wall 5 and/or between the rear wall 8 and the bottom wall 4, through which respectively the air flow 14 can flow from the enclosure between the rear wall 8 and the exterior wall 6 into the interior chamber 7. FIG. 6 shows for example a slot 51 between the rear wall 6 and the top wall 4. FIG. 7 shows for example two slots 52, 53 between the rear wall 8 and the bottom wall 4.

Figure 9:
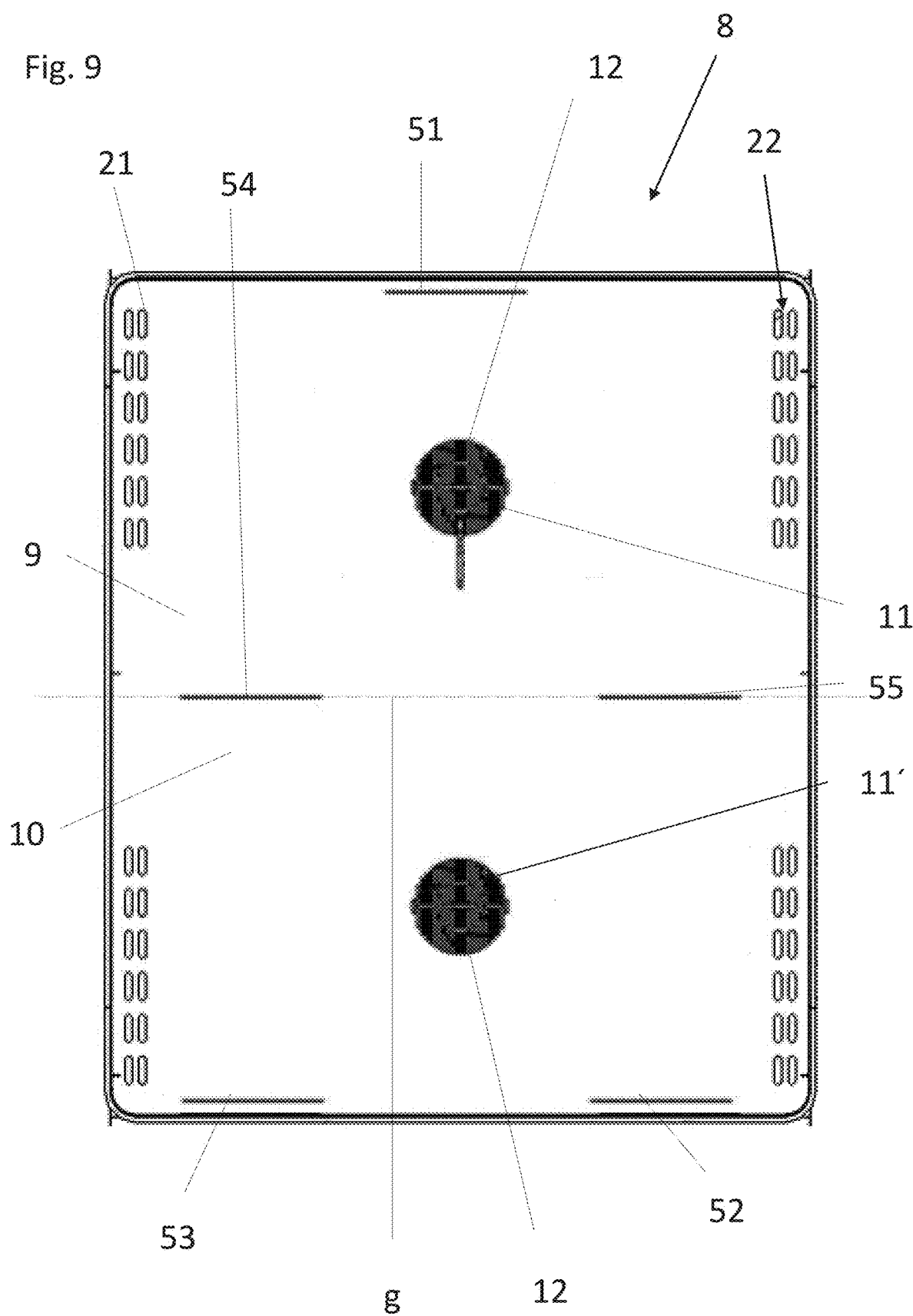
FIG. 9 is a line drawing evidencing a view from the front of an exemplary embodiment of a rear wall of an exemplary embodiment of a simulation cabinet with two ventilators.

Additionally, simulation cabinets 1 are also possible, showing several ventilators 11 between the rear wall 8 and the exterior wall 6. FIG. 9 shows for example a rear wall 8 with two arrangements of ventilator openings 12 according to FIGS. 2, 3. A ventilator 11 and/or 11' is arranged behind every air opening 12 between the rear wall 8 and the exterior wall 6, with respectively a separating wall being arranged between the ventilators 11 and 11'. The enclosure between the rear wall 8 and the exterior wall 6 may be divided by the separating wall, for example extending in the direction side wall-side wall y, into an upper chamber 9 and a lower chamber 10. The separating wall may for example be embodied as an angular element. In the upper chamber 9, directly behind the ventilator openings 12, a first ventilator 11 is arranged. A second ventilator 11' is arranged in the lower chamber 10 directly behind the ventilator openings 12. The upper chamber 9 and the lower chamber 10 may respectively show a similar design for the simulation cabinet with a ventilator 11 according to FIG. 1. Several ventilators 11 are particularly advantageous for larger-scale simulation cabinets 1.

The rear wall 8 may show slots, preferably two slots 54, 55, arranged preferably arranged on a straight line g. The slots 54, 55 are particularly arranged between the separating wall and the ventilator opening 12 of the upper chamber 9. The air flow 14 can flow through each of the slots 54, 55 out of the enclosure between the rear wall 8 and the exterior wall 6 into the interior chamber 7.

FIG. 9 shows a symmetrical arrangement of pairs 22 of openings 21 with six pairs of openings 21, for example, in each corner of the rear wall 8, with a distance between two adjacent pairs 22 potentially being identical in the bottom-top direction x. However, other, particularly asymmetrical arrangements of pairs 22 of openings 21 are also possible in a simulation cabinet with several ventilators 11, particularly similar to a simulation cabinet 1 with one ventilator 11.

LIST OF REFERENCE NUMBERS

1 Simulation cabinet
2 side wall
3 side wall
4 bottom wall
5 top wall
6 exterior wall
7 interior chamber
8 rear wall
9 chamber
10 chamber
11 ventilator
11' ventilator
12 ventilator openings
12' slot
13 air guidance element
13*a* lateral edge
13*b* lateral edge
14 air flow
21 opening
22 pair
31 flow restrictor
32 flow restrictor
41 proximity
42 proximity
43 proximity
44 proximity
51 slot
52 slot
553 slot
54 slot
55 slot
61 heating device
62 heating device
71 bead
d1 distance
k1 lateral edge of the rear wall
k2 lateral edge of the rear wall
k3 lateral edge of the rear wall
k4 lateral edge of the rear wall
s1 intersection
s2 intersection
s3 intersection
s4 intersection
α angle
β angle
x direction
y direction
g straight line
A axis of rotation The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A simulation cabinet comprising: two side walls, a bottom wall, a top wall, an exterior wall, and an interior chamber, with a rear wall arranged in the interior chamber at a distance from the exterior wall and an enclosure between the rear wall and the exterior wall, and at least one ventilator arranged in the enclosure between the rear wall and the exterior wall, with the rear wall showing ventilator openings for suctioning air from the interior chamber via the at least one ventilator, wherein the rear wall comprises at least one opening and that a first flow restrictor is arranged in the enclosure between the rear wall and the exterior wall abutting the first flow restrictor, such that the air suctioned by the at least one ventilator through the ventilator openings of the rear wall is guided to the first flow restrictor, after flowing through the first flow restrictor, and is guided through the at least one opening into the interior chamber, wherein the rear wall comprises, in the proximity to each intersection of the lateral edges of the rear wall, a pair of openings, with one pair comprising at least two openings, distanced in the side wall-side wall direction, aligned parallel.

2. The simulation cabinet according to claim 1, wherein two flow restrictors are arranged between the rear wall and the exterior wall.

3. The simulation cabinet according to claim 1, wherein the rear wall and a second flow restrictor are connected to each other as one piece.

4. The simulation cabinet according to claim 1, wherein a second flow restrictor having a length equivalent to a distance from the bottom wall to the top wall of the simulation cabinet.

5. The simulation cabinet according to claim 1, wherein a second flow restrictor has an angle (α) of essentially 90° with reference to the rear wall and the exterior wall.

6. The simulation cabinet according to claim 1, wherein a second flow restrictor is embodied as a perforated plate.

7. The simulation cabinet according to claim 1, wherein the rear wall has several openings, arranged in proximities of interfaces of lateral edges of the rear wall, with a longitudinal extension of the proximities essentially being smaller than ⅓ of the length of a lateral edge of the rear wall.

8. The simulation cabinet according to claim 7, wherein the several openings have the same size of area content, respectively.

9. The simulation cabinet according to claim 1, wherein at least one opening in a bottom-top direction respectively shows a greater extension than in aside wall-side wall direction.

10. The simulation cabinet according to claim 1, further comprising wherein at least one slot is arranged between the rear wall and the top wall.

11. The simulation cabinet according to claim 1, further comprising wherein at least one, preferably two slots are arranged between the rear wall and the bottom wall.

12. The simulation cabinet according to claim 1, wherein the two side walls opposite each other comprise beads to support grids or sheet metals.

13. The simulation cabinet according to claim 1, further comprising wherein the several ventilators are arranged between the rear wall and the exterior wall, with one separating wall arranged between the ventilators, respectively.

14. A simulation cabinet comprising: two side walls, a bottom wall, a top wall, an exterior wall, and an interior chamber, with a rear wall arranged in the interior chamber at a distance from the exterior wall and an enclosure between the rear wall and the exterior wall, and at least one ventilator arranged in the enclosure between the rear wall and the exterior wall, with the rear wall showing ventilator openings for suctioning air from the interior chamber via the at least one ventilator, wherein the rear wall comprises at least one opening and that a first flow restrictor is arranged in the enclosure between the rear wall and the exterior wall abutting the first flow restrictor, such that the air suctioned by the at least one ventilator through the ventilator openings of the rear wall is guided to the first flow restrictor, after flowing through the first flow restrictor, is guided through the at least one opening into the interior chamber, wherein, within a proximity of a first, second, and third interface of lateral edges of the rear wall, precisely one pair in each of openings and three pairs of openings in a proximity of a fourth intersection of the lateral edges of the rear wall being arranged, with the three pairs in the proximity of the fourth intersection being arranged in the bottom-top direction.

15. The simulation cabinet according to claim 14, wherein each of the three pairs in the proximity of the fourth intersection of the lateral edges of the rear wall extends parallel to the bottom-top direction, essentially with a respectively identical distance.

16. The simulation cabinet according to claim 14, wherein adjacent pairs of the three pairs in the proximity of the fourth intersection in the bottom-top direction each have identical distances.

17. A simulation cabinet comprising, two side walls, a bottom wall, a top wall, an exterior wall, and an interior chamber, with a rear wall arranged in the interior chamber at a distance from the exterior wall and an enclosure between the rear wall and the exterior wall, and at least one ventilator arranged in the enclosure between the rear wall and the exterior wall, with the rear wall showing ventilator openings for suctioning air from the interior chamber via the at least one ventilator, wherein the rear wall comprises at least one opening and that a first flow restrictor is arranged in the enclosure between the rear wall and the exterior wall abutting the first flow restrictor, such that the air suctioned by the at least one ventilator through the ventilator openings of restrictor, is guided through the at least one opening into the interior chamber, further comprising wherein an air guidance element is embodied as sheet metal and arranged at the rear wall, with a first lateral edge at the rear wall and with a second side edge at a vertical edge of the first flow restrictor.

18. The simulation cabinet according to claim 17, wherein, at an installation of the rear wall and the first flow restrictor in the simulation cabinet, the first side edge of the air guidance element is arranged at a side wall of the simulation cabinet and the second lateral edge of the air guidance element abuts the exterior wall of the simulation cabinet.

19. The simulation cabinet according to one of claim 17, wherein the air guidance element, together with the rear wall and the first flow restrictor abutting the exterior wall, respectively form an angle (β) showing essentially 45°.

20. A simulation cabinet comprising: two side walls, a bottom wall, a top wall, an exterior wall, and an interior chamber, with a rear wall arranged in the interior chamber at a distance from the exterior wall and an enclosure between the rear wall and the exterior wall, and at least one ventilator arranged in the enclosure between the rear wall and the exterior wall, with the rear wall showing ventilator openings for suctioning air from the interior chamber via the at least one ventilator, wherein the rear wall comprises at least one opening and that a first flow restrictor is arranged in the enclosure between the rear wall and the exterior wall abutting the first flow restrictor, such that the air suctioned by the at least one ventilator through the ventilator openings of the rear wall is guided to the first flow restrictor, after flowing through the first flow restrictor, is guided through the at least one opening into the interior chamber, further comprising wherein at least one heating device is arranged between the rear wall and the exterior wall, surrounding the at least one ventilator, with the at least one heating resistive device surrounding the ventilator either helically or annularly.

21. The simulation cabinet according to claim 20, further comprising wherein the at least one ventilator is surrounded by a first and a second heating resistive device, with the second heating resistive device surrounding the at least one ventilator and the first heating resistive device.

22. The simulation cabinet according to claim 21, wherein the first heating resistive device is embodied helically and the second heating resistive device annularly.

* * * * *